(12) United States Patent
Vuletic et al.

(10) Patent No.: US 11,306,769 B2
(45) Date of Patent: Apr. 19, 2022

(54) BALL JOINT

(71) Applicant: Robert Bosch GmbH, Stuttgart (DE)

(72) Inventors: Darko Vuletic, Bogatic (RS); Jens Ulrich, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 354 days.

(21) Appl. No.: 16/319,866

(22) PCT Filed: May 10, 2017

(86) PCT No.: PCT/EP2017/061150
§ 371 (c)(1),
(2) Date: Jan. 23, 2019

(87) PCT Pub. No.: WO2018/019440
PCT Pub. Date: Feb. 1, 2018

(65) Prior Publication Data
US 2019/0264734 A1    Aug. 29, 2019

(30) Foreign Application Priority Data

Jul. 29, 2016 (DE) .................... 10 2016 214 084.1

(51) Int. Cl.
*F16C 11/10*     (2006.01)
*F16C 11/06*     (2006.01)
*B60S 1/34*      (2006.01)

(52) U.S. Cl.
CPC ........ *F16C 11/106* (2013.01); *F16C 11/0671* (2013.01); *F16C 11/10* (2013.01); *B60S 1/3445* (2013.01); *F16C 2326/09* (2013.01)

(58) Field of Classification Search
CPC . F16C 11/0657; F16C 11/069; F16C 11/0695; F16C 11/106; F16C 2326/09; B60S 1/24
See application file for complete search history.

(56) References Cited

U.S. PATENT DOCUMENTS 2,513,637 A * 7/1950 Herreshoff ............ F16B 21/078
403/122
2,987,333 A * 6/1961 Lobdell ................. F16C 11/069
403/122

(Continued)

FOREIGN PATENT DOCUMENTS

BE        499755      3/1951
CN    101687478 A    3/2010

(Continued)

OTHER PUBLICATIONS

International Search Report for Application No. PCT/EP2017/061150 dated Aug. 7, 2017 (English Translation, 2 pages).

*Primary Examiner* — Matthew R McMahon
(74) *Attorney, Agent, or Firm* — Michael Best & Friedrich LLP

(57) ABSTRACT

The invention relates to a ball joint (10) for a wiper system, comprising a ball shell (12), a ball head (14) within the ball shell (12), a hinged rod (16) into which the ball shell (12) is inserted, and a securing means (18), wherein the securing means (18) engages around the hinged rod (16), in order to reduce an opening (20) in the ball shell (12) to a blocking distance (d), such that the ball head (15) can be removed from the ball shell (12). The invention further relates to a method for assembling the ball joint (10).

17 Claims, 3 Drawing Sheets

(56) References Cited

U.S. PATENT DOCUMENTS

| | | | | |
|---|---|---|---|---|
| 4,512,600 A | * | 4/1985 | King | E05F 1/1058 |
| | | | | 292/338 |
| 5,865,558 A | * | 2/1999 | Cebollero | F16C 11/069 |
| | | | | 403/133 |
| 6,413,126 B1 | * | 7/2002 | Johnson | B63H 11/113 |
| | | | | 114/144 R |
| 8,888,396 B2 | * | 11/2014 | Halcom | F16C 11/0614 |
| | | | | 403/143 |
| 2015/0033632 A1 | * | 2/2015 | Huelsebusch | B60J 5/0416 |
| | | | | 49/405 |

FOREIGN PATENT DOCUMENTS

| | | | | |
|---|---|---|---|---|
| DE | 464438 C | * | 8/1928 | F16C 11/069 |
| DE | 2117085 | | 10/1971 | |
| DE | 2712118 | | 10/1977 | |
| DE | 4424062 A1 | * | 1/1996 | F16C 11/069 |
| DE | 102006039761 B3 | * | 2/2008 | F16C 1/14 |
| EP | 0800010 A1 | | 10/1997 | |
| FR | 1327427 A | * | 5/1963 | F16C 11/0619 |
| GB | 258201 A | * | 9/1926 | F16C 11/069 |
| GB | 1170011 A | * | 11/1969 | F16C 11/069 |
| GB | 2046687 A | * | 11/1980 | F16C 11/069 |
| JP | 60245824 | | 12/1985 | |
| WO | WO-2013132627 A1 | * | 9/2013 | F16D 23/12 |

\* cited by examiner

BALL JOINT

BACKGROUND OF THE INVENTION

Ball shells in which a ball head is arranged are known, said ball head being enclosed by the ball shell. This constitutes a ball joint. In this case, the ball shell is configured such that the ball head is able to be fitted by a key-lock principle into the ball shell. In this case, the ball shell comprises an opening which has a contour which follows the shape of the contour of the ball head. The ball head may be pushed by means of this contour and by a rotation in the circumferential direction thereof the two contours are offset to one another so that the ball head can no longer be removed from the ball shell.

SUMMARY OF THE INVENTION

The present invention has the advantage relative to the prior art that a ball joint may be provided cost-effectively. To this end, the ball joint is configured for a wiper system of a motor vehicle. The ball joint comprises a ball shell and a ball head within the ball shell. The ball shell is inserted into a hinged rod. In this case the ball shell may be injection-molded into the hinged rod, wherein the ball shell consists of plastics. The ball head is secured by a securing means against inadvertently leaving the ball shell, wherein the securing means engages around the hinged rod. An opening of the ball shell, through which the ball head is inserted, is reduced by the securing means to a blocking distance such that the ball head cannot be removed from the ball shell. Further embodiments are set forth in the subclaims.

Preferably, at least one shaped portion is arranged on one edge of the hinged rod. Thus the securing means may be easily latched into the shaped portion and a high level of security is ensured. The shaped portion is arranged relative to the axial direction of the hinged rod, in particular, adjacent to and/or spaced apart from the ball shell. It is possible to produce a plurality of such shaped portions.

Advantageously, the securing means is configured to be U-shaped and preferably consists of plastics and/or sheet metal. The U-shape of the securing means is formed by two limbs which have free and fixed ends. The free ends are spaced apart by the blocking distance d. The fixed ends are connected together.

The ball shell has the opening on one side and a closed cap on the opposing side. The cap and the opening are arranged on two different sides of the hinged rod. The securing means is, in particular, a U-shaped clamp which has two limbs which are designed to be continuous on the closed side in the region of the cap of the ball shell. Thus a simple arrangement may be achieved. In the region of the opening, the free ends of the limbs are bent radially inwardly. Therefore, projections which have the blocking distance d from one another are formed at the ends. The projections may be configured as straight sheet metal pieces.

Expediently, the securing means is provided with at least one side wall which extends substantially parallel to the hinged rod. It is conceivable that two side walls are arranged, said side walls in each case extending on one side of the hinged rod. The opening is blocked by a side wall. The side wall comprises a slot with a blocking distance d. In the case of the second side wall on the side of the cap, the second side wall may also have a slot or may be configured to be continuous and without an interruption in the form of a slot. The securing means has a latching recess for the cap on the inwardly oriented edge of the opposing second side wall.

Moreover, only one recess may be formed with a closed edge or a raised portion, the cap being able to be engaged therein. Preferably a chamfer which blocks the opening is arranged in the region of the free end of the limbs on the side wall. This assists the assembly of the securing means.

The securing means is groove-shaped. It has two side walls and these side walls are connected together by means of a U-shaped clamp so that, along the securing means, the securing means always has a U-shaped cross section in the manner of a groove. If a straight groove were to be imagined, which were to be bent to form a U-shape so that the groove opening were oriented inwardly and the groove base were oriented outwardly, the shape of the securing means would be reached. In this case the groove base is provided by the U-shaped clamp. The securing means along its limbs has a U-shaped cross section in the axial direction. In this case, the limbs are connected together to form a U-shape. The securing means engages around the axial end of the hinged rod, wherein the edge in its circumferential direction protrudes into the groove-shaped securing means. This ensures a secure hold.

The securing means is shell-shaped, wherein the limbs are connected together along the side wall on the opening side and the opposing second side wall between the limbs is interrupted. Thus the side wall on the opening side represents the only connection between the limbs. The end of the hinged rod remains uncovered by the securing means. The connection between the side walls is also interrupted so that a continuous U-shaped clamp is not formed. In this case the securing means covers two edge cutouts opposing one another in parallel. This permits the securing means to be used in the case of a plurality of ball joint designs.

It is advantageous for the mounting that the securing means is guidable along the hinged rod. Thus the securing means may be already positioned onto the hinged rod before the ball shell and the ball head are inserted. Subsequently, the securing means may be pushed in the direction of the free end and engaged, so that the ball head is secured in the ball shell. Thus the mounting may be implemented in a simple manner.

A ball stud is arranged on the ball head. The ball stud may be surrounded by a seal which seals the opening of the ball shell. Thus no fluid may escape from or enter the ball shell. The securing means is arranged on the seal. The seal may be made of rubber or a different resilient material. In this case, the seal may be injection-molded thereon by an injection-molding method, before or after the ball stud has been inserted. It is also conceivable that the seal is previously produced as a separate component and then positioned onto the ball stud.

The ball stud may be designed with a retaining projection—preferably a collar. The retaining projection extends radially from the ball stud. The retaining projection may be configured as a circumferential collar or as a plurality of retaining projections. It is also conceivable to arrange a plurality of retaining projections axially adjacent to one another. The radial dimension of the retaining projection is greater than the blocking distance d. It is possible to provide a ball stud having a retaining projection with a seal between the retaining projection and the ball shell.

For the assembly of the ball joint, the ball shell is fastened to the hinged rod and the ball head is inserted. The securing means secures the ball head, is moved along the hinged rod and is engaged on the ball shell. An alternative thereto is the direct mounting of the securing means on the region of the ball shell. To this end, the securing means is placed onto the ball shell which is inserted into the hinged rod, without the securing means previously having been arranged on the hinged rod. It is possible to arrange the securing means before or after the ball head has been fitted into the ball shell.

DETAILED DESCRIPTION

Figure 1A:
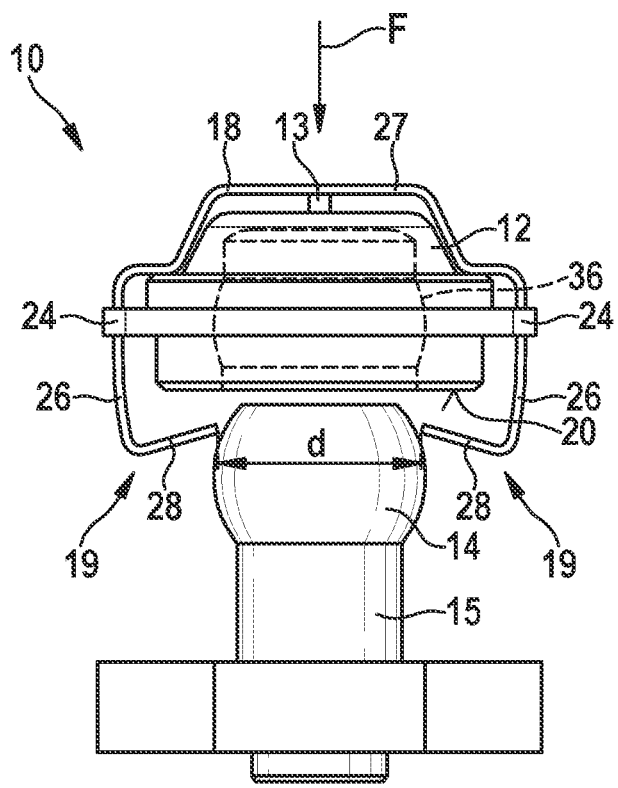
FIG. 1a shows an unmounted ball joint with a U-shaped clamp as securing means.

A ball joint 10 for a wiper system of a motor vehicle is shown in each case in the figures. The ball joint 10 comprises a ball shell 12 and a ball head 14 inside the ball shell 12. A hinged rod 16 in which the ball shell 12 is inserted is also shown. A securing means 18 engages around the ball rod 16 so that an opening 20 of the ball shell 12 is reduced to a blocking distance d. The ball head 14 is inserted through the opening into the ball shell 12. After the opening is reduced to the blocking distance, the ball head 14 can no longer be removed from the ball shell 12, so that the opening is blocked.

Figure 1B:
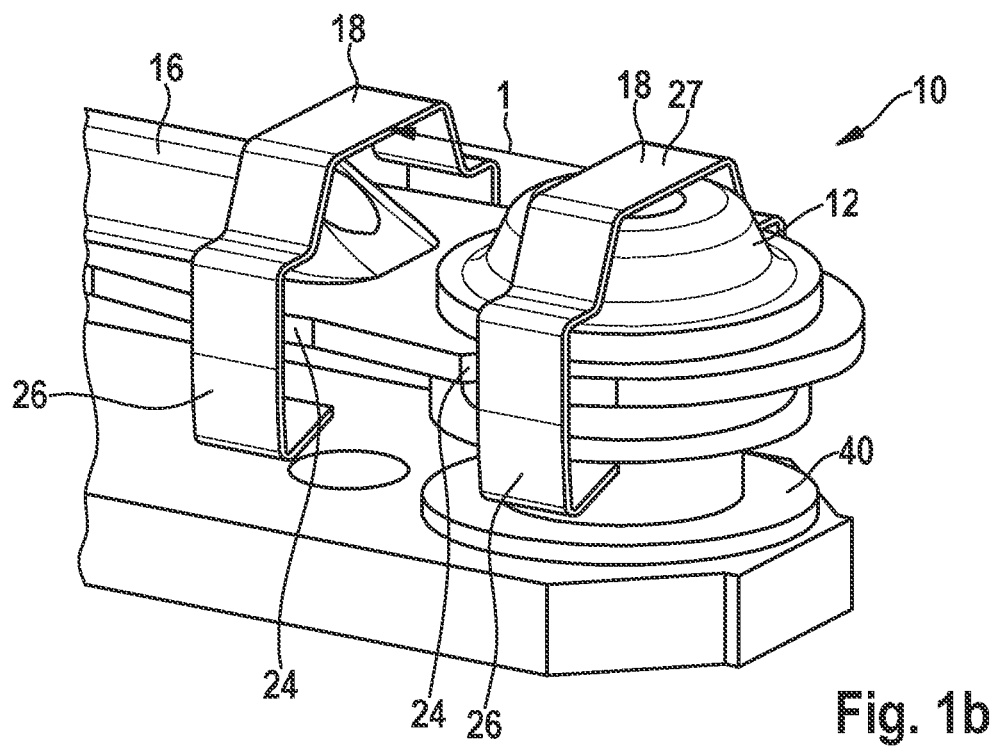
FIG. 1b shows a mounted ball joint with a U-shaped clamp as securing means, wherein this securing means is mounted by a movement along the hinged rod.
Figure 3:
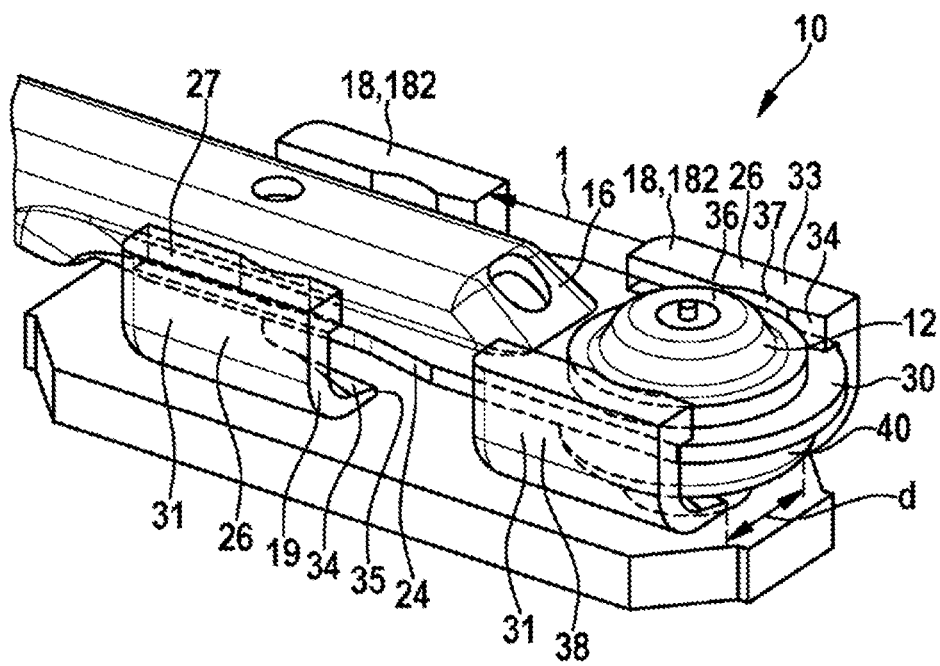
FIG. 3 shows a mounted ball joint with a shell-shaped securing means.
Figure 4:
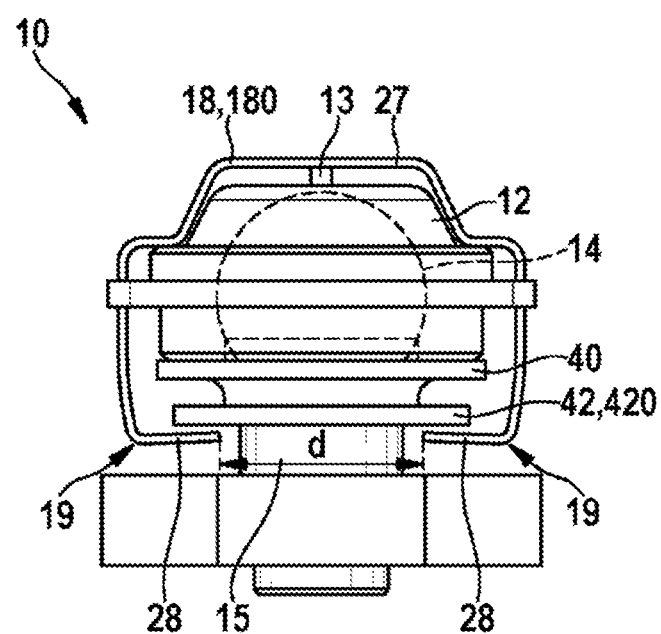
FIG. 4 shows a mounted ball joint with a seal.

At least one shaped portion 24 is arranged on one edge 22 of the hinged rod 16, the securing means 18 being engaged therein, which may be seen in FIGS. 1a and 1b and 4. The shaped portion 24 is arranged relative to the axial direction 1 of the hinged rod 16, in particular, adjacent to and/or spaced apart from the ball shell 12. In FIGS. 1a and 1b two shaped portions 24 are formed symmetrically, adjacent to the ball shell. A further shaped portion 24 which is also symmetrical and which is integrally formed so as to be spaced apart from the ball shell is shown in FIG. 1b. The shaped portion 24 which is spaced apart is further away from one end 30 of the hinged rod 16 than the ball shell 12. This shaped portion 24 serves for guiding the securing element 18 in the axial direction 1. The securing means 18 of the figures is configured to be U-shaped and is preferably produced from plastics and/or sheet metal. The U-shape is formed by two limbs 26 which are connected together and have two free ends 19. The blocking distance d is formed at least at one point on the limbs 26. In FIGS. 1a and 1b and 4, the blocking distance is formed between the free ends 19 whilst in FIGS. 2a, 2b and 3 the blocking distance d is formed between the limbs 26 spaced apart from the free ends 19 thereof.

The securing means 18 of FIGS. 1a and 1b and 4 is a U-shaped clamp 180 which has two limbs 26. The limbs 26 are designed to be continuous with one another on the closed side in the region of a cap 36 of the ball shell 12 and thus connected together. In the region of the opening 20 the free ends 19 of the limbs 26 are bent radially inwardly so that projections 28 which have the blocking distance d from one another are formed. The projections 28 retain the ball head 14.

Figure 2A:
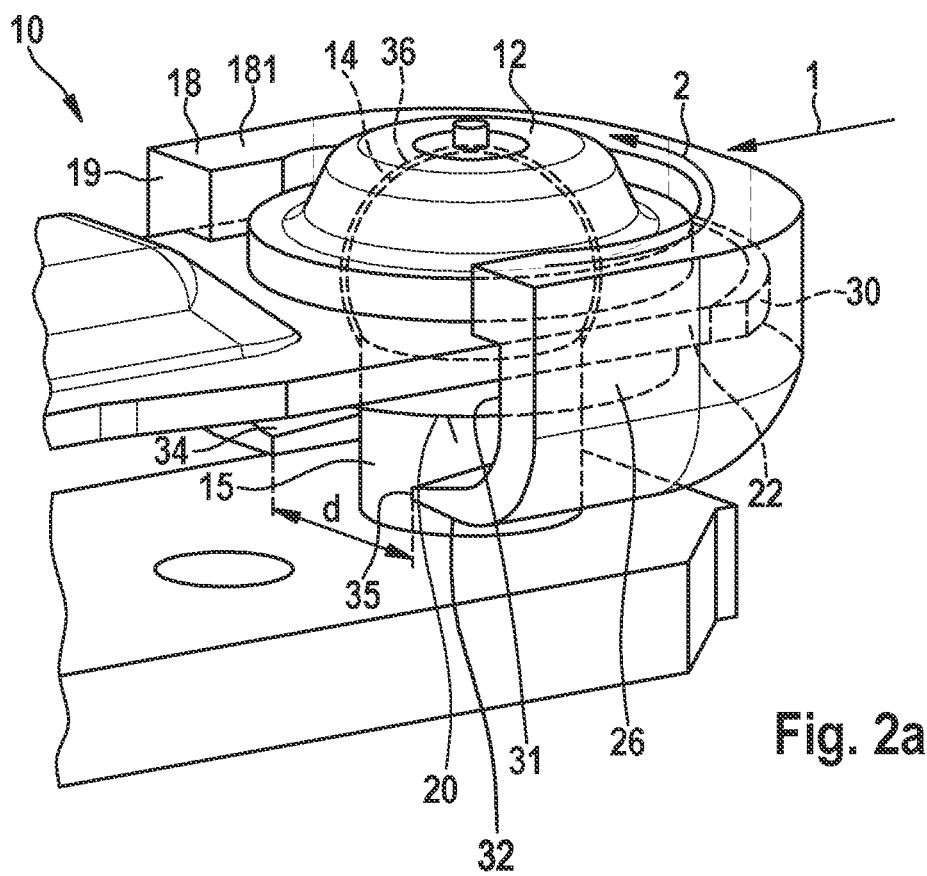
FIG. 2a shows a mounted ball joint with a groove-shaped securing means.
Figure 2B:
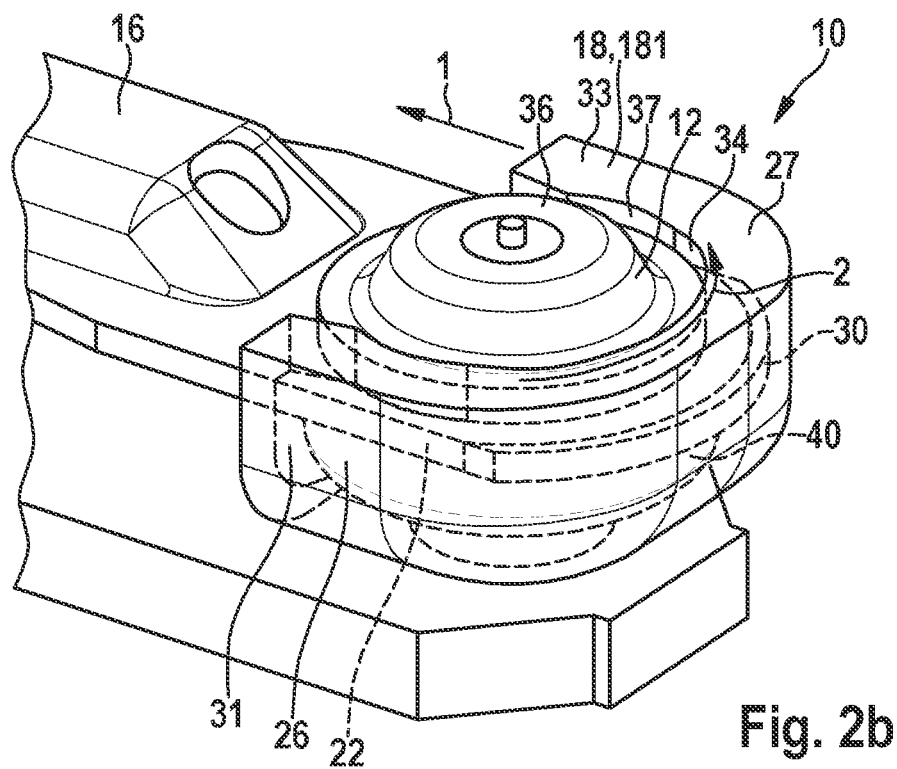
FIG. 2b shows a mounted ball joint with a groove-shaped securing means.

The securing means 181, 182 of FIGS. 2a, 2b and 3 blocks the opening 20 with a side wall 32, wherein the side wall 32 has a slot 35 with the blocking distance d and preferably a chamfer 34 in the region of the free end 19 of the limbs 26. The blocking distance d is located on the opening 20. The side wall 32 is parallel to the hinged rod 16. The chamfer 34 is inclined axially outwardly. The slot 35 extends from the free ends 19 to the fixed ends of the limbs 26.

The securing means 181 of FIGS. 2a and 2b is groove-shaped, since a side wall 32 on the opening side opposes a second side wall 33 on the cap side, in parallel, wherein the two side walls 32, 33 are connected together by a wall in the manner of a U-shaped clamp. The wall 31 in the manner of a U-shaped clamp constitutes the groove base. The cross section along the limbs 26 is U-shaped in the axial direction 1. A connection 27 of the fixed ends is configured between the limbs. This connection 27 engages around the axial end 30 of the hinged rod 16. The edge 22 along the hinged rod 16 protrudes in the circumferential direction 2 into the groove-shaped securing means 181.

The securing means 182 is shell-shaped and has a side wall 32. The limbs 26 are connected together along the side wall 32 on the opening side, as may be seen in FIG. 3. No connection 27 extends along the edge of the end 30 of the hinged rod 16. The opposing side wall 33 between the limbs 26 is interrupted.

The securing means 181, 182 of FIGS. 2a, 2b and 3 has on the inwardly oriented edge 34 of the opposing side wall 33 a latching recess 37 for the cap 36. The latching recess 37 is curved and has a radius which is greater than or equal to the radius of the cap 36. The end 30 of the hinged rod 16 in FIG. 3 is not covered by the securing means 182 since the wall 31 is interrupted in the region between the limbs 26. In this case the securing means 182 covers two parallel opposing edge cutouts 38 with two portions of the interrupted wall 31. In this case, the securing means 182 is guidable along the hinged rod 16 and before it is engaged on the cap 36 by means of the latching recess 37 is positioned in a shaped portion 24, wherein the shaped portion 24 is spaced apart from the cap 36.

A ball stud 15 which is surrounded by a seal 40 is arranged on the ball head 14, as shown in FIGS. 2b and 4. The opening 20 of the ball shell 12 is sealed by the seal 40. The seal 40 is injection-molded or positioned as a separate component. The securing means 18 is arranged on the seal 40.

Additionally, a retaining projection 42 may be designed on the ball stud 15 as a collar 420, as illustrated in FIG. 4. The diameter of the collar 420 is greater than the blocking distance d. The seal 40 in this case is arranged between the collar 420 and the ball shell 12.

In FIG. 1a an unmounted ball joint 10 is shown. The U-shaped clamp 180 is engaged on the ball shell 12 in the shaped portions 24. A nipple 13 is configured on the upper face of the cap 36 in order to assist the connection 27 of the limbs 26. The projections 28 have to be guided past the ball head 14 by an axial force F or pivoted-in to the side directly on the ball stud 15 until the ball head 14 comes to rest in the ball shell 12.

The invention claimed is:

1. A ball joint (10) for a wiper system, the ball joint comprising a ball shell (12), a ball head (14) within the ball shell (12), a hinged rod (16) into which the ball shell (12) is inserted and a securing means (18), wherein the hinged rod (16) is elongated in an axial direction (1), wherein the securing means (18) defines two opposing U-shaped cross sections in a first plane perpendicular to the axial direction (1), wherein the hinged rod (16) extends into the opposing U-shaped cross-sections, and wherein the securing means

(18) engages around the hinged rod (16) in order to reduce an opening (20) in the ball shell (12) to a blocking distance (d), such that the ball head (14) cannot be removed from the ball shell (12); wherein the securing means (18, 181) is groove-shaped and has a third U-shaped cross section in a second plane perpendicular to the first plane and perpendicular to a direction of insertion of the ball head (14) into the ball shell (12) and two limbs (26) connected together at a connection at one end, wherein each of the limbs (26) forms a respective one of the opposing U-shaped cross-sections in the first plane, wherein the limbs (26) and the connection form the third U-shaped cross-section, and wherein the connection engages around an axial end (30) of the hinged rod (16).

2. The ball joint (10) as claimed in claim 1, wherein at least one shaped portion (24) is arranged on one edge (22) of the hinged rod (16), the securing means (18) engaging therein, wherein the shaped portion (24) is arranged relative to the axial direction (1) of the hinged rod (16).

3. The ball joint (10) as claimed in claim 1, wherein the ball shell (12) has a surface including the opening (20), and wherein the two limbs (26) of the securing means determine the blocking distance (d) and extend on both sides of the surface.

4. The ball joint (10) as claimed in claim 3, wherein the blocking distance (d) is a distance between the limbs (26), and wherein the blocking distance (d) is less than a maximum diameter of the ball head (14).

5. The ball joint (10) as claimed in claim 1, wherein the securing means (181, 182) blocks the opening (20) with a side wall (32), wherein the side wall (32) comprises a slot (35) with the blocking distance (d).

6. The ball joint (10) as claimed in claim 1, wherein an edge (22) of the hinged rod in a circumferential direction (2) protrudes into the groove-shaped securing means (181).

7. The ball joint (10) as claimed in claim 1, wherein the securing means (181, 182) has a latching recess (37) for a cap (36) on an inwardly oriented edge (34) of an opposing side wall (33).

8. The ball joint (10) as claimed in claim 1, wherein the securing means (182) is guidable along the hinged rod (16).

9. The ball joint (10) as claimed in claim 1, wherein a ball stud (15) is arranged on the ball head (14), said ball stud being surrounded by a seal (40) which seals the opening (20) of the ball shell (12), wherein the securing means (18) is arranged on the seal (40).

10. The ball joint (10) as claimed in claim 9, wherein the ball stud (15) comprises a retaining projection (42), wherein the dimension of the retaining projection (42) is greater than the blocking distance (d).

11. The ball joint (10) as claimed in claim 10, wherein the seal (40) is arranged between the retaining projection (42) and the ball shell (12).

12. The ball joint (10) as claimed in claim 9, wherein the ball stud (15) comprises a retaining collar (420), wherein the dimension of the retaining collar is greater than the blocking distance (d).

13. The ball joint (10) as claimed in claim 1, wherein at least one shaped portion (24) is arranged on one edge (22) of the hinged rod (16), the securing means (18) engaging therein, wherein the shaped portion (24) is arranged relative to the axial direction (1) of the hinged rod (16) adjacent to and/or spaced apart from the ball shell (12).

14. The ball joint (10) as claimed in claim 1, wherein the securing means (18) consists of plastics and/or sheet metal, wherein the two limbs (26) of the securing means determine the blocking distance (d).

15. The ball joint (10) as claimed in claim 1, wherein the two limbs (26) of the securing means form the blocking distance (d), wherein the securing means (181, 182) blocks the opening (20) with a side wall (32), and wherein the side wall (32) comprises a slot (35) with the blocking distance (d) and a chamfer (34) in the region of free ends (19) of the two limbs (26).

16. A method for assembling a ball joint (10) as claimed in claim 1, wherein the ball shell (12) is injection-molded onto the hinged rod (16) and the ball head (14) is inserted and is secured by the securing means (18), wherein the securing means (18) is moved the hinged rod (16) after the ball head (14) has been inserted.

17. The method as claimed in claim 16, wherein a seal (40) is placed on the ball stud (15) before the securing means (18) is arranged.

* * * * *